May 7, 1968
G. BIXBY, JR
3,381,604
COFFEE VENDING DEVICE
Filed June 6, 1966
4 Sheets-Sheet 1
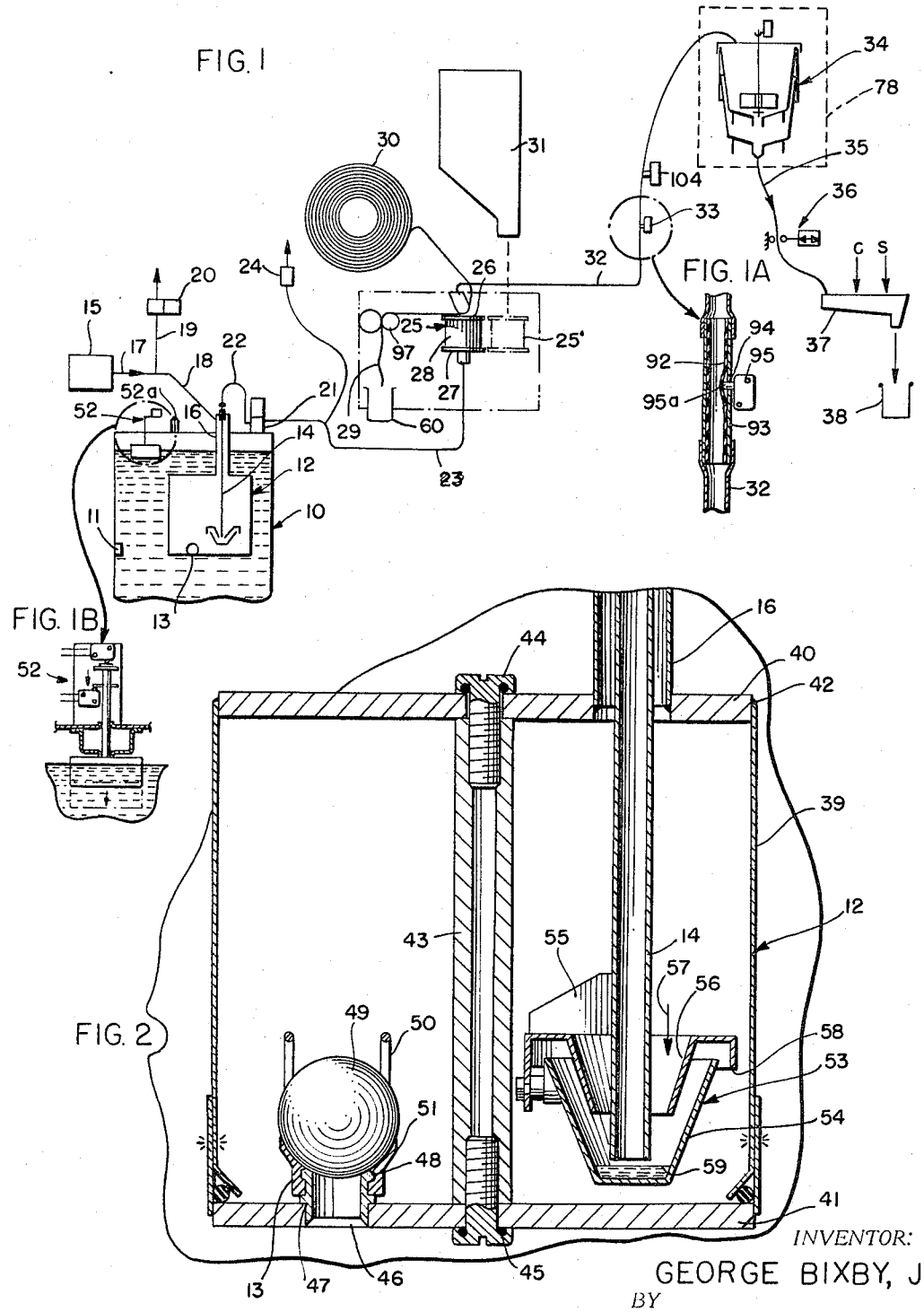
INVENTOR:
GEORGE BIXBY, JR.
BY
Dawson, Tilton, Fallon, Lungmus Alexander
ATT'YS

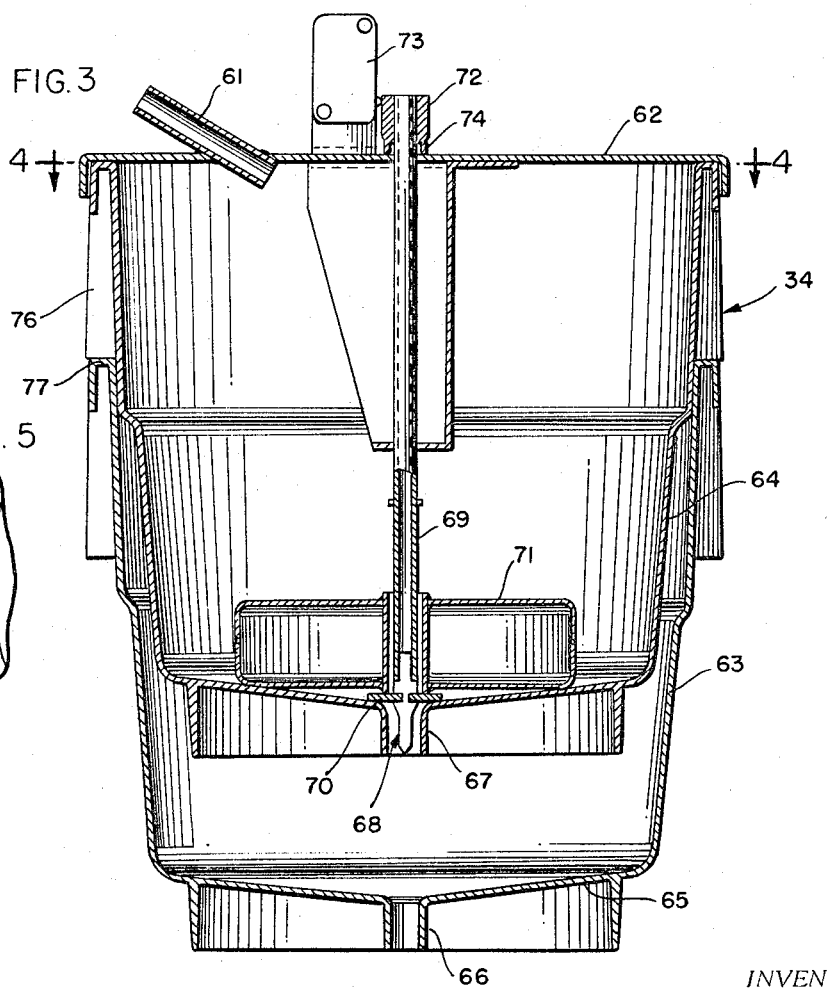

May 7, 1968
G. BIXBY, JR
3,381,604
COFFEE VENDING DEVICE
Filed June 6, 1966
4 Sheets-Sheet 3
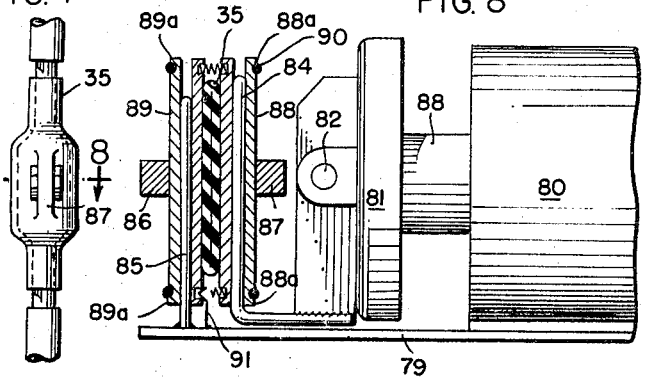
*INVENTOR:*
GEORGE BIXBY, JR.
BY
Dawson, Tilton, Fallon, Lungmus & Alexander
ATT'YS

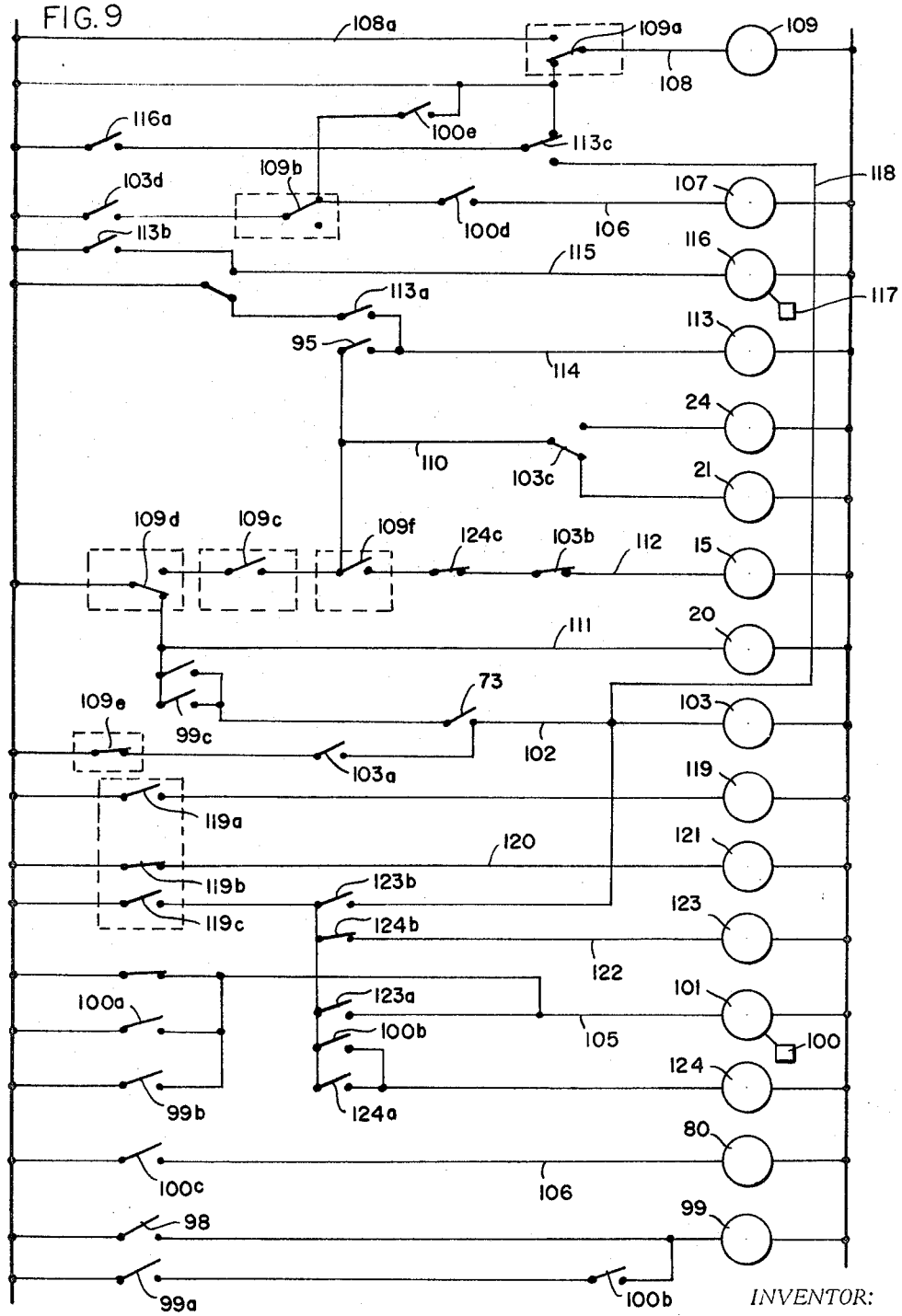

United States Patent Office 3,381,604
Patented May 7, 1968

3,381,604
COFFEE VENDING DEVICE
George Bixby, Jr., Scottsdale, Ariz., assignor to Automatic Marketing Industries, Inc., Phoenix, Ariz., a corporation of Arizona
Filed June 6, 1966, Ser. No. 555,514
4 Claims. (Cl. 99—283)

ABSTRACT OF THE DISCLOSURE

A coffee vending device having a brewing chamber coupled by means of a resilient hose to a double container reservoir, sensing means being associated with the resilient hose for controlling the flow of liquid to the reservoir and a float valve associated with the reservoir for controlling blending of liquid coffee in the double, nested containers.

Background of invention

In the vending of coffee at commercial and industrial sites, there is a problem in making sure that the coffee is fresh. There is also a need to dispense coffee rapidly. The two objectives are inconsistent. For ideally fresh coffee, the brewing should be performed just before dispensing, but the time consumed would make the apparatus unacceptably slow. This dilemma is solved by the instant invention, and the provision of a device for this purpose constitutes an object of the invention.

Other objectives of the invention include the provision of component parts in the vending device which perform in unique and advantageous manner as will be ascertained from a consideration of the construction and operation set down in this specification.

The invention is described in conjunction with an illustrative embodiment in the accompanying drawing, in which:

FIG. 1 is essentially a schematic picturization, generally in elevation, of the overall vending apparatus;
FIGS. 1A and 1B are enlargements of the encircled portions of FIG. 1;
FIG. 2 is a vertical sectional view in fragmentary form of a portion of the hot water storage tank seen in reduced scale in the extreme lefthand portion of FIG. 1;
FIG. 3 is an enlarged vertical sectional view of the coffee reservoir seen in the upper righthand portion of FIG. 1;
FIG. 4 is a fragmentary sectional view taken along the line 4—4 of FIG. 3;
FIG. 5 is a fragmentary sectional view taken along the sight line 5—5 of FIG. 4;
FIG. 6 is a fragmentary elevational view, in enlarged scale, of a valve shown schematically in the central righthand portion of FIG. 1;
FIG. 7 is a fragmentary side elevational view of a portion of the valve of FIG. 6;
FIG. 8 is a fragmentary top plan view of the valve of FIGS. 6 and 7; and
FIG. 9 is a schematic wiring diagram of the electrical circuitry used in connection with the mechanical apparatus of FIG. 1.

In the illustration given and with particular reference to FIG. 1, the numeral 10 designates generally a hot water tank which is provided in a housing (not shown) but which may be of the console type commonly associated with a vending operation. The numeral 11 applied to the tank 10 of FIG. 1 indicates schematically a heating element of conventional design for controlling the water temperature.

Positioned centrally within the tank 10 is a measuring chamber generally designated 12 which is adapted to receive and deliver a predetermined quantity of hot water for the brewing of liquid coffee. The chamber 12 is equipped with a check valve inlet as at 13 and an outlet pipe as at 14. Liquid is forced from the chamber 12 by means of compressed air supplied from a compressor 15 coupled to an annular supply pipe 16 by means of supply pipes 17 and 18. Interconnected with the pipes 17 and 18 is a vent pipe 19, the flow of air through which is controlled by a valve 20.

Hot water from the chamber 12 issuing through the pipe 14 passes through a brewing valve 21, entering the valve through a connective line 22, and leaving the valve through a line 23. A valve designated by the arrow 24 serves as a vent for the line 23 to be described more fully hereinafter.

Hot water flowing through the line 23 enters the coffee brewer generally designated 25, entering the brewer 25 through the bottom 27, and issuing from the brewer through a top closure 26. Interposed between the chamber body 28 of the brewer and the upper closure 26 is a filter 29 which may be provided in the form of a continuous web and which is advanced in stepwise fashion for each brew from a roll of filter cloth or paper 30. Ground solid coffee is provided for the brewer 25 from a hopper 31 suitably actuated by the circuitry of FIG. 9.

The brewed liquid coffee issuing from the top closure 26 of the brewer 25 flows through a line 32 and past a sensing valve 33 into a reservoir generally designated 34. Upon demand—as by the insertion of a coin into the bending machine console (not shown)—hot liquid coffee issues from the reservoir 34 through the discharge line 35 and past a control valve generally designated 36 into a commodity trough 37. In the commodity trough, the hot black coffee may be mixed with cream schematically represented by the symbol C and/or sugar, designated by the symbol S, after which the coffee passes to a container 38 removed by the vendee.

Referring now to FIG. 2, the details of construction of the measuring chamber 12 can be seen. The chamber 12 includes a side wall 39 which may be cylindrical, closed by a top wall 40 and a bottom wall 41. The walls are advantageously constructed of a sterilizable material such as stainless steel and may be integrated by welding as at 42, a spacer rod 43 interconnects the top and bottom walls 40 and 41, respectively, through the use of suitable bolts as at 44 and 45. Hot water enters the chamber 12 through the check valve 13 previously referred to. For this purpose, the bottom wall is equipped with an aperture as at 46, and mounted in the aperture is a nipple or short length of pipe 47. Advantageously, the pipe 47 is constructed of metal and is equipped with an annular rib as at 48 to define a valve seat for a nylon ball 49. The ball 49 is confined within a spider or cage 50 mounted on the bottom wall 41, and the ball 49 is further guided into seating engagement with the seat 48 by means of a frustoconical resilient sleeve as at 51.

Water entering the tank 10 is under the control of a float valve generally designated 52 (only in FIG. 1), in conventional fashion. During the filling operation, the excess air is vented through the tube 52a so as to permit complete filling of the tank 10. The details of the float valve can be seen in FIG. 1B.

Hot water discharge

When additional coffee is called for in the reservoir 34, and the vent valve 20 is closed by the next purchase, the compressor 15 delivers compressed air to the concentric tube 16 via the lines 17 and 18. This forces the hot water out of the chamber 12 through the discharge pipe 14, and in so doing, the water passes through a siphon device generally designated 53 (see particularly FIG. 2).

The above-mentioned siphon device 53 includes a generally frusto-conical-shaped casing as at 54 which is suitably secured to the pipe 14 by means of an integral mounting bracket 55. An inlet cone 56 is positioned within the frusto-conical casing 54 and is also rigidly maintained in place by means of the integral bracket 55. In the initial stages of hot water discharge, most of the water enters the inner cone 56 as indicated by the arrow 57. As the level drops progressively, a point is reached where the water level is below the lip 58 of the inner flanged cone 56. Thereafter, the only water that can be forced up the pipe 14 is that contained within the frusto-conical casing 54—and then only until the level of the order of that designated 59 is reached. The use of the siphon device 53 insures a clean cutoff or sharp demarcation in comparison with previous discharge pipes which were not equipped with such a cutoff end closure. Even with slight variations in air pressure at about the time the siphon device 53 is exhausted, there will only be a slight additional amount of water delivered through the discharge pipe 14—as compared with a relatively large amount that could be so delivered if the pipe were merely positioned above a large expanse of heated water with a turbulent surface due to the inrush of compressed air. In other words, minimal aspiration is a characteristic of the measuring chamber of the invention, and this is advantageous in a device where relatively small batches of coffee are brewed in order to insure a minimum amount of water being dumped with the spent coffee grounds.

The hot water cutoff provided by the siphon device 53 insures that the grounds within the brewer 25 are subjected to a blast of air, not a mixture of water and air, so that the grounds are quickly sapped of excess water. This results in a much easier maintenance program, since the spent grounds that are discharged to a waste receptacle as at 60 are relatively dry.

The hot water from the measuring chamber 12, after being converted to liquid coffee by virtue of extracting the ground coffee in the brewer 25, passes into the top of the reservoir generally designated 34 and which can be seen in greater detail in FIGS. 3–5. In FIG. 3, the inlet pipe, designated by the numeral 61, is seen to be provided as part of a top closure or cover 62. Advantageously, the entire reservoir may be constructed of a plastic material such as polypropylene, and it will be seen by reference to FIG. 3 that the reservoir includes a pair of substantially identical cups as at 63 and 64, the cup 64 being partially nested or received within the lower cup 63.

Each cup 63 or 64, as the case may be, has an integral bottom wall as at 65 (relative to the cup 63) and which is equipped with a central discharge spout as at 66 (for communication with the pipe 35 of FIG. 1). The discharge spout 67 of the upper reservoir container 63 is equipped with a valve generally designated 68 which includes an elongated stem 69. Fixed to the stem 69 is a closure member 70 adapted to seal the discharge spout 67, and above the closure member 70 is a float element 71, also secured to the elongated stem 69. The stem 69 extends upwardly and through the cover 62, above the cover 62 being equipped with a switch actuator collar 72. The collar 72 acts in conjunction with an electrical switch 73 mounted on top of the cover 62. It will be noted that the collar 72 is of reduced diameter at the portion 74 so that upon a predetermined amount of upward movement of the stem 69, the condition of the switch 73 is changed.

Each container 63 and 64 is equipped with longitudinally-extending ribs as at 75 in FIGS. 4 and 5, which permit the displacement of air from the lower nested container 63 when hot liquid coffee is introduced thereinto through the discharge spout 67 of the upper nested container. Further, each container is equipped with a plurality of longitudinally-extending outer flanges as at 76, which support the upper container on the lip 77 of the lower container.

It is contemplated that the containers will be thrown away at regular intervals—weekly, or whenever routine maintenance is performed on the entire apparatus. In the ordinary operation of coffee brewing apparatus of the size herein provided, after about a week there is the beginning of a layer of dried coffee deposited on the interior walls of the containers 63 and 64. This would indicate that frequency of replacement. The volume of each of the containers 63 and 64 is of the order of 135 cubic inches, i.e., about 75 liquid ounces. With the float arranged as shown, this means that the reservoir 34 consisting of the combined containers 63 and 64 will ordinarily contain from 4 to 9 cups of coffee, depending upon how many cups of coffee have been withdrawn from the reservoir 34 since the last charge. During the residence of brewed coffee within the reservoir 34, the same is advantageously maintained in hot condition by means of an insulating enclosure as at 78 in FIG. 1. Withdrawal of hot liquid coffee from the reservoir 34 is achieved by means of a valve 36 which will now be described.

*Dispensing valve*

Referring to FIG. 6, the numeral 79 designates a plate secured to the interior of the console and which provides a means for mounting a solenoid 80 (see also FIG. 8). The solenoid armature 81 is connected by means of a bolt 82 to a bracket 83 provided as part of a movable post 84. The posts 84 and 85 are equipped with sleeves or rigid tubular members 88 and 89, respectively, which are somewhat longer than the flattened width of the tubing 35. At each end of these rigid tubes a circular groove on the outside diameter thereof as at 88a and 89a accepts a small garter spring 90. The springs 90 provide the sealing force by drawing the tubular members 88 and 89 together at both ends.

The post 84 is seen to be longer than the post 85 to ease the replacement of the tube assembly. The assembly includes the tube 35, two tubular members as at 88 and 89, the two garter springs 90, plus any other required tubing for the connection of the assembly to the reservoir. Additionally, the plate 79 supports a retainer spring 91 which engages the groove 89a of the tubular member 89 and thus releasably immobilizes the valve assembly just described.

When the solenoid 80 is not energized, the garter springs 90 maintain the normally flat and collapsed tube in this condition, as seen in FIG. 8. It will be appreciated that tube 35 is made normally flat and that the springs 90 insure sealing. The solenoid 80 insures opening of the tube 35. If the tube 35 were round, as other devices available, excess spring force would be required along with a larger solenoid 80. When, however, the solenoid 80 is energized, the armature 81 is retracted and permits outflow of hot coffee. I find the valving arrangement described with reference to FIGS. 6–8 to be of significant advantage in connection with the dispensing of hot liquids. It will be appreciated that the tubing 35, although resilient, is utilized only as a conducting medium, subject to control by positive mechanical action. This avoids the problems inherent in utilizing just the resiliency of a tube, which has been the characteristic of prior pinch valves. With liquids at a temperature of the order of 200° F., the resilient materials tend to lose a degree of their inherent resiliency after a while, so that flow does not occur instantaneously upon the application of a signal, and since many of these devices are employed in conjunction with a time discharge, less-than-full cups of coffee are vended. I find it advantageous in the illustrative embodiment to make use of a silicone rubber as the material of construction of the tube 35 and the associated integral, opposed exterior flanges or fins 86 and 87. Further, pinching of the inherent resilient materials more often than not require greater force to close the same, hence larger solenoids to open such tubing. The high force just described can be damaging to materials at the high temperatures encountered in operations such as coffee vending.

In the operation of the apparatus, the pressure-responsive valve 33 is advantageously employed to regulate the cycle of brewing. It will be appreciated that following the passage of a predetermined amount of hot water through the brewer 25, air will follow, as mentioned previously in connection with drying the spent coffee grounds. When this pressure surge of air reaches the device 33, a sensible signal is provided for use in regulating the remainder of the apparatus. This device may take the form of flexible tubing 92 ensleeved by a metal tube 93 apertured as at 94 (see FIG. 1A). The actuator 95a of a snap-action switch 95 extends through the aperture 94 to bear against the tubing 92. The function of the device 33, as well as the remaining portions of the apparatus, will now be described particularly relative to FIGS. 1 and 9.

Operation

When there is adequate hot liquid coffee in the reservoir 34, the valve 36 is actuated by a conventional coin mechanism responsive to the insertion of a coin by the vendee. The actuating mechanism and the means for augmenting the coffee with cream and/or sugar in the commodity trough 96 may take the form of conventional valving.

During the period of "non-brewing," i.e., when there is adequate reserve fluid in the reservoir 34, I arrange the apparatus with the brewer 25 in standby condition as at 25'. The top closure 26 remains in place and the filter paper 29 is in contact therewith, having previously been unwound a specified length by means of an unwind device designated 97 in FIG. 1. Also during this condition of operation, the hot water tank 10 is full of water—at least to the level designated by the float mechanism 52—and this necessarily means that the measuring chamber 12 is also filled with water to the same level.

When the quantity of hot liquid coffee in the reservoir 34 drops to a predetermined level, i.e., when the float 71 drops to the position indicated in FIG. 3 and wherein the switch 73 is actuated by the larger diameter portion of the collar 72, the apparatus is conditioned for a brew cycle.

Float 71, at some liquid level, will add some of its weight to the shaft 69 and release cam 72 from switch 73. The shaft 69 will drop until the disc 70 seals the outlet in container 64. The float in FIG. 3 is shown in the condition it would occupy when the reservoir is empty.

However, no brewing occurs until a coin is introduced into the console. Because of this, I avoid the possibility that coffee might be brewed and stand for several hours before another cup is called for. By providing the double-chambered reservoir 34, there is always enough coffee available upon call to accommodate vendees even during the brewing cycle.

Vend sequence

A coin through the changer (not shown) closes switch 98 to energize the coil 99 of the vend relay (see the extreme bottom of FIG. 9). The coil 99 remains energized by the closing of associated contacts 99a. Coil 99 also closes contacts 99b energizing timer motor 101 through circuit 105. A vend timer switch 100a continues to energize the timer motor 101 to operate the timer 100 and another vend timer switch 100b deenergizes the vend relay coil 99. The vend timer 100 schedules the black coffee plus cream and sugar and, after that, the vend timer stops.

Brewing sequence

A brew cycle is set up when the black coffee in the reservoir 34 is low and the reservoir switch 73 is closed (when about 5 cups remain).

The act of purchasing the 5th remaining cup initiates the brew by completing the circuit 102 to the coil 103 associated with relay 104 (see FIG. 1), this circuit being completed through the resservoir switch 73 and contacts 99c of the vend relay. Once this is done, the timer 100 in addition to closing contacts 100a and 100b, closes contacts 100c which actuate the solenoid 80 in circuit 106. Thus, it will be apparent that during the brewing cycle, the machine is continuously capable of vending coffee.

The next step in the sequence, following the energization of the coil 103, is the change in position of the contacts associated therewith, i.e., contacts 103a which serve to continue energizing the coil 103, opening of contacts 103b, shifting of two-way contacts 103c and closing of contacts 103d. The contacts 103d are in circuit 106 which includes the coffee hopper motor 107 and a set of contacts associated with the vend timer 100, the last-mentioned contacts being designated 100d. The vend timer 100 governs the amount of ground coffee delivered to the brew chamber 25.

At this juncture, the vend timer 100 breaks the coffee hopper motor circuit 106 (by opening contacts 100d) and completes the brewer motor-starting circuit 108, the brewer motor being designated 109 at the extreme upper righthand portion of FIG. 9. In circuit 108, are included contacts 100e which are closed coincident with the opening of contacts 100d.

The energization of the brewer motor 109, starts the brew chamber 25 toward the closed position, i.e., to the solid line showing in FIG. 1. Further, the brewer motor actuates switch contacts 109a to complete the circuit 108 through the line 108a and thus is independent of the contacts 103d and 100e. Another switch 109b associated with the brewer motor has its position changed as do switches 109c and 109d in circuit 110 which includes the brew valve 21. The shift in position of switch 109b deenergizes the air vent valve 20 provided in circuit 111 and the change in position of switch 109e deenergizes the relay coil 103 provided in circuit 102.

At this juncture, the brewing chamber 25 is closed and a switch 109f associated with the brewer motor completes circuit 112 to the air compressor 15. At this particular juncture, the brewer motor 109 is functioning as is the brew valve 21 in the circuit 110 and the vend timer motor 101 in the circuit 105. The brewer motor also causes the closing of contacts 109e for future energization of the relay coil 103. Meanwhile, the vend timer 100 will have completed its ten-second cycle during the early part of the brew period.

When this occurs, the pressure-sensing device 33 experiences a sudden pulse of increased pressure when the measured amount of water passes the flow-control screw (not shown) in brew valve 21 for the driving air is not resisted by the control screw to the extent that the water is resistant. The switch 95 energizes a relay coil 113 with current flowing through switch 109d and 109c ultimately through circuit 114. This is a momentary pulse and results in the closing of contacts 113a and 113b. The closing of contacts 113b sends current flowing through circuit 115 to energize a relay motor 116. Thus, the relay coil 113 establishes its own holding circuit and also starts the timer 117 associated with the relay motor 116.

Next, with the relay motor 116 running, excess water is removed from the grounds and thereafter the relay switch 116a, operating through the previously shifted switch 113c, energizes the coil 103, current flowing through circuit 118. When the relay coil 103 is energized, the brew valve 21 is deenergized by the repositioning of switch 103c, the air compressor 15 is deenergized by the repositioning of contacts 103b and air relief valve 24 is energized.

In the sequence just described, the pressure in the brewing chamber 25 is relieved just prior to opening. Following that, the brewer motor 109 is again energized and the relay coil 113 is deenergized, this occurring as a result of the repositioning of switch 113c.

Next, follows the opening or repositioning of the brewing chamber 25, the relay motor 116 having completed its cycle and opening contacts 116a. Following this, the brewer motor switch 109e breaks the circuit 102 to the relay coil 103 which changes the switch 103e to the position shown and which energizes the brew valve 21 when the brew chamber is inverted for dumping grounds. The spend grounds are blown out by the compressed air.

The brewer now switches to standby position with only the air vent circuit 111 being energized, the brewer motor 109 returning to standby which in turn breaks the brew valve circuit and energizes the just-mentioned air vent circuit 111.

*Reservoir dump cycle*

At an assigned time, the dump timer which operates continuously, (not shown) energizes the dump valve 119 to release all black coffee from the reservoir 34. This occurs through the timer operating switches 119a, 119b and 119c, the switcher contacts 119b deenergizing circuit 120 so that a "sold out" light 121 is illuminated and so that the coin changer returns the customer's coin during the dump cycle. The contacts 119c operate through circuit 122 to energize a dump relay coil 123. In turn, the dump relay coil completes an initiating circuit by closing contacts 123a in circuit 105 to the timer motor 101 and contacts 123b to energize the relay coil 103.

As the machine dumps the black coffee, it also prepares a fresh brew, this stemming from the fact that the relay coil 103 is energized and the vend timer actuates switch 100d to activate coffee hopper motor 107. The black coffee is still in the process of being dumped during this phase of the operation. Thereafter, the vend timer 100 initiates the brew relay coil 124 by virtue of closing contacts 100f and the brew relay coil becomes self-energized by virtue of closing associated contacts 124a. Further, the brew relay coil 124 opens contacts 124b to deenergize the dump relay coil 123 in circuit 122. Still further, the brew relay switch 124c is opening in circuit 112 to the air compressor 15. Thereafter, the brewing sequence outlined above is followed.

While in the foregoing specification a detailed description of an embodiment of the invention has been set down for the purpose of explanation, many variations in the details herein given may be made by those skilled in the art without departing from the spirit and scope of the invention.

I claim:

1. Coffee vending apparatus, comprising a coffee-brewing chamber, means for supplying a predetermined quantity of heated water to said chamber, reservoir means coupled to said chamber for storing hot liquid coffee, a resilient hose coupled to said reservoir means for discharging hot liquid coffee therefrom, and valve means operably associated with said resilient hose for positively collapsing and expanding the same, said reservoir means includes a double-container arrangement wherein two substantially identical containers are nested, and float valve means operable associated with the inner of the nested containers for controlling the blending of liquid in said containers.

2. The structure of claim 1 in which switch means are mounted on said reservoir for actuating by said float valve.

3. The structure of claim 2 in which said containers are generally frusto-conical in construction and equipped with longitudinally-extending vent means.

4. Coffee vending apparatus, comprising a coffee-brewing chamber, means for supplying a predetermined quantity of heated water to said chamber, reservoir means coupled to said chamber for storing hot liquid coffee, a resilient hose coupled to said reservoir means for discharging hot liquid coffee therefrom, and valve means operable associated with said resilient hose for positively collapsing and expanding the same, a sensing device being interposed between said chamber and reservoir means responsive to the last liquid flowing between said chamber and reservoir means for controlling the brewing cycle of said apparatus.

References Cited

UNITED STATES PATENTS

| | | | |
|---|---|---|---|
| 2,979,931 | 4/1961 | Hubbard et al. | 251—7 X |
| 3,085,494 | 4/1963 | Rosander | 99—281 X |
| 3,278,153 | 10/1966 | Dallas | 251—7 |
| 3,338,153 | 8/1967 | Holstein et al. | 99—282 X |

WILLIAM I. PRICE, *Primary Examiner.*